United States Patent [19]
Stenlund

[11] Patent Number: 6,130,942
[45] Date of Patent: Oct. 10, 2000

[54] SKILLS-BASED AUTOMATIC CALL DISTRIBUTION SYSTEM

[75] Inventor: Bo Stenlund, Fountain Valley, Calif.

[73] Assignee: Ericsson Inc., Research Triangle Park, N.C.

[21] Appl. No.: 09/183,324

[22] Filed: Oct. 30, 1998

[51] Int. Cl.$^7$ ........................................... H04Q 3/64
[52] U.S. Cl. ........................... 379/265; 376/266; 376/309
[58] Field of Search ................................... 379/265, 266, 379/309

[56] References Cited

U.S. PATENT DOCUMENTS

| | | | |
|---|---|---|---|
| 4,788,715 | 11/1988 | Lee | 379/84 |
| 5,185,782 | 2/1993 | Srinivasan | 379/266 |
| 5,721,770 | 2/1998 | Kohler | 379/266 |
| 5,740,238 | 4/1998 | Flockhart et al. | 379/265 |
| 5,825,869 | 10/1998 | Brooks et al. | 379/265 |
| 5,828,747 | 10/1998 | Fisher et al. | 379/309 |
| 5,903,641 | 5/1999 | Tonisson | 379/266 |
| 5,905,793 | 5/1999 | Flockhart et al. | 379/266 |
| 5,982,873 | 11/1999 | Flockhart et al. | 379/266 |

FOREIGN PATENT DOCUMENTS

| | | | |
|---|---|---|---|
| 772335A2 | 7/1997 | European Pat. Off. | H04M 3/50 |

*Primary Examiner*—Krista Zele
*Assistant Examiner*—William J. Deane, Jr.
*Attorney, Agent, or Firm*—Jenkens & Gilchrist, P.C.

[57] ABSTRACT

A skills based telephone call distribution system is disclosed. The system determines the informational needs of an incoming caller and defines a set of skills an agent should possess to serve the caller. A search is performed for an available agent possessing the skill set. Upon the search failing to locate an available agent possessing the skill set, the amount of time the caller may expect to wait therefor is estimated. The estimated time is compared to a maximum waiting time. If the estimated time is greater than the maximum waiting time, then the skill set is redefined to include a greater number of agents who may serve the caller. A new search is performed for an available agent possessing the redefined skill set.

31 Claims, 2 Drawing Sheets

SKILLS-BASED AUTOMATIC CALL DISTRIBUTION SYSTEM

BACKGROUND OF THE INVENTION

Technical Field of the Invention

The present invention relates to a skills-based automatic call distribution (ACD) system, and particularly to an ACD system in which a caller having informational needs is routed to one of a number of agents possessing various skills and skill levels defined by a comparison of an estimated waiting time for the caller with a maximum allowed waiting time.

Background and Objects of the Invention

In call distribution centers, incoming callers needing information are assigned to agents trained to provide informational services. Traditionally, agents possessing similar skills are organized into groups. A caller who is assigned to a particular group of agents oftentimes must wait for an available agent of the group. When the queue corresponding to the group of agents becomes unreasonably large, callers in the queue are reassigned to agents in other groups according to predetermined rules. In many instances, a reassigned caller is assigned to an agent in another group having skills and skill levels which substantially differ from those needed by the caller.

A skills-based ACD system, on the other hand, takes advantage of the fact that agents possess different skills and skill levels. In a skills-based ACD system, the skills and skill levels of each agent are recorded and attempts are made to closely match the informational needs of the incoming callers to the particular skills of the agents. Because each agent may potentially possess skills which match the needs of an incoming caller, the skills-based ACD system can draw upon a larger pool of agents in providing informational services to an incoming caller.

A skills-based ACD system, however, is not without its shortcomings. In an overloaded situation, agents possessing the ideal skills needed by a caller may not be available. In such instances and in an effort to provide some level of informational services to the caller in a reasonable amount of time, a search is performed for an agent having skills which provide a less than ideal match to the caller's needs. There exists a need for a skills-based ACD system in which the caller's informational needs are substantially optimally provided to the caller.

It is an object of the invention to provide a skills-based ACD system which effectively balances the time a caller waits for an agent against the caller being connected to the most suitably skilled agent.

Another object of the invention is to provide such a system which broadens the pool of potential agents which may serve an incoming caller based upon actual and estimated waiting time periods to serve the caller.

It is another object of the present invention to provide informational services to incoming callers within a predetermined period of time.

SUMMARY OF THE INVENTION

The present invention overcomes shortcomings in existing automatic call distribution systems and satisfies a significant need for an efficient ACD system which substantially optimally balances the time delay in serving a caller against closely matching the skills required by the caller to the skills of the serving agent.

According to a preferred embodiment of the present invention, there is provided an automatic call distribution system and method. In the present system, an estimated waiting time (EWT) a caller is expected to wait before being served is calculated in each instance in which no agents having the desired skills are available to serve an incoming caller. In the event the calculated EWT exceeds a predetermined maximum waiting time (MWT) period, the system broadens the pool of agents which may potentially serve the caller by reducing the set of skills an agent is desired to possess. If a search of the larger agent pool finds no available agents to serve the caller, the EWT is recalculated based upon both the original and reduced skill sets. This procedure continues in a repetitive manner so long as the calculated EWT exceeds the MWT and no available agents are found possessing the necessary skills to serve the caller.

If the calculated EWT is found to be less than the MWT, the caller is placed in a queue for an agent or agents having the identified set of skills to serve the caller. Once placed in a queue, the actual time the caller waits for an available agent is monitored. If the actual waiting time (AWT) for the caller exceeds the MWT, then the desired agent skill set is modified to include a greater number of agents. A search for an available agent is subsequently performed based upon the modified agent skill set. If the search identifies no such available agent, then the agent skill set is further modified to include an even greater number of agents. Another search is subsequently performed. The process of identifying an available agent generally continues in this iterative manner until an agent is found having skills which suitably match the caller's informational needs, at which point the caller is connected thereto.

BRIEF DESCRIPTION OF THE DRAWINGS

A more complete understanding of the present invention may be had by reference to the following detailed description when taken in conjunction with the accompanying drawings wherein.

DETAILED DESCRIPTION OF THE PREFERRED EXEMPLARY EMBODIMENTS

The present invention will now be described more fully hereinafter with reference to the accompanying drawings in which a preferred embodiment of the invention is shown. This invention may, however, be embodied in many different forms and should not be construed as being limited to the embodiment set forth herein. Rather, the embodiment is provided so that this disclosure will be thorough and complete, and will fully convey the scope of the invention to those skilled in the art.

Figure 1:
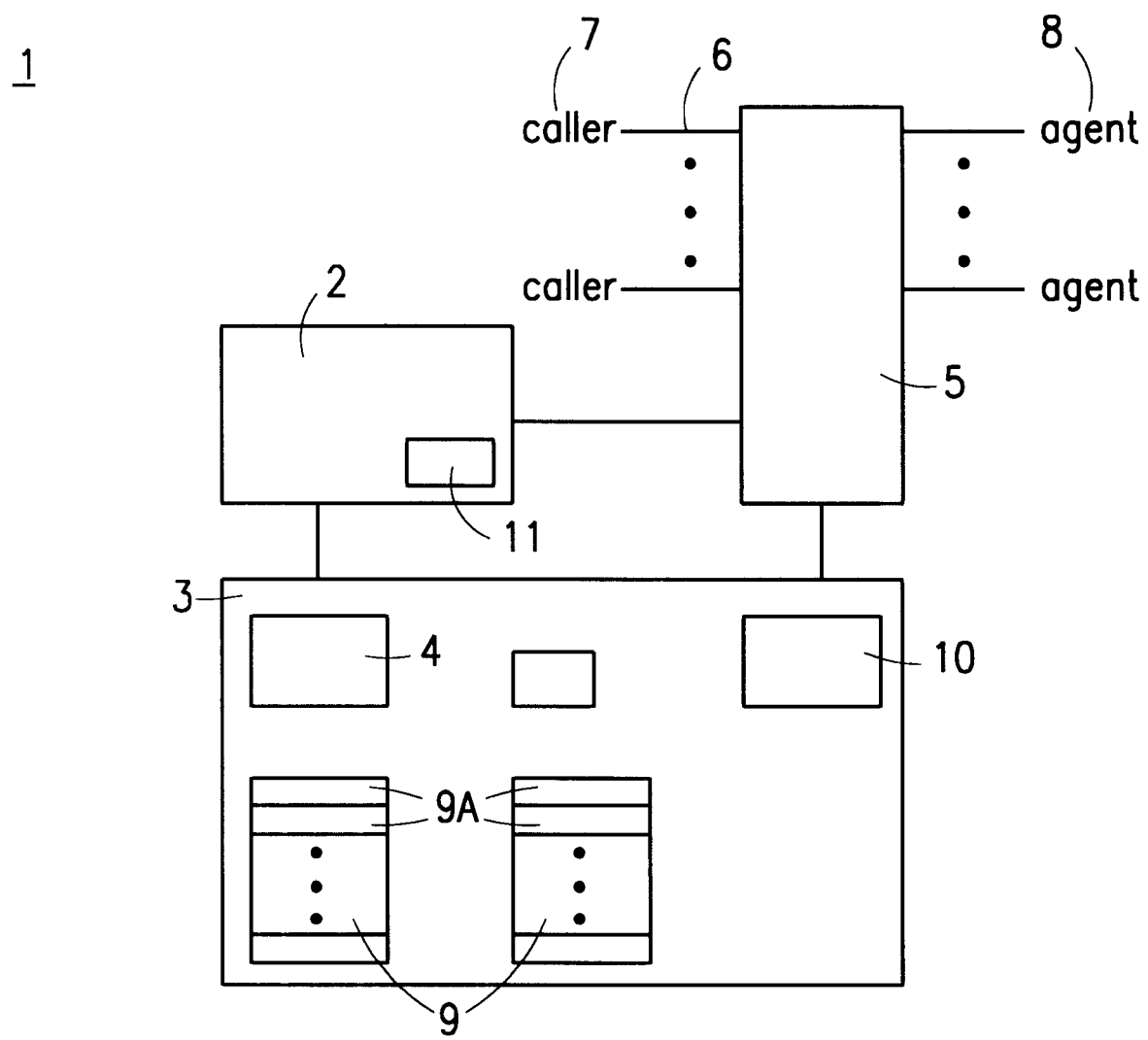
FIG. 1 is a block diagram of an automatic call distribution system according to the present invention.

Referring to FIG. 1, there is shown an automatic call distribution (ACD) system 1, including processor 2 and memory 3 for storing program software 4 and other data. Processor 2 preferably controls switch 5 so as to selectively route incoming telephone calls 6 from callers 7 seeking information to a plurality of agents 8 having various skills and skill levels. Processor 2 preferably manages the routing of incoming telephone calls 6 so that callers 7 are connected to agents 8 possessing the necessary skills to provide callers 7 with the information they seek.

In addition to controlling the routing of callers 7 to suitably qualified agents 8, the ACD system 1 preferably manages the scheduling of services to callers 7 in the event that no agents 8 having the desired skill qualifications are immediately available to suitably serve callers 7. The ACD system 1 preferably includes queues 9 which are maintained in memory 3 by processor 2. Each queue 9 is a block of memory in memory 3 having positions 9A for identifying an enqueued telephone call 6. Queues 9 preferably act as first-in, first-out (FIFO) memory buffers. The present system preferably makes an entry in the appropriate queue 9 to identify a caller 7 for which a qualified agent 8 is presently unavailable.

According to the present invention, each queue 9 preferably contains entries of callers 7 seeking similar assistance and/or requiring an agent 8 possess certain skills. The skills required by callers 7 may include a number of distinct skills, either related or unrelated to each other. For instance, one queue 9 may comprise those callers 7 seeking Spanish-speaking, technical support for a particular PC software application.

The present system 1 is preferably capable of determining the needs of an incoming caller 7 and identifying the particular set of skills an agent 8 should possess in order to serve caller 7. ACD system 1 may identify caller needs by considering the particular number dialed by caller 7, caller-provided answers to a menu-based query system in which caller 7 is asked to respond to a number of questions, or other techniques.

Based upon the identification of the informational needs of a caller 7, processor 2 and system software 4 are capable of determining the skill set an agent 8 should possess in order to suitably serve caller 7. System 1 preferably maintains a database 10 containing a record of each agent 8. An agent record may include a listing of those skills which the agent 8 possesses which may reasonably be drawn upon in serving a caller 7. The skill entries in agent database 10 are searchable for use in identifying agents 8 who are best qualified to serve a caller 7.

The ACD system 1 is preferably capable of matching the skills of agents 8 to the needs of a caller 7. Processor 2 and system software 4 preferably monitor the activity of agents 8 who are logged onto system 1 and are not serving another caller 7. System 1 searches agent database 10 for agents who possess the set of previously-determined set of skills which an agent 8 should possess in order to serve a caller 7. The results of the agent search are compared to the list of available agents who are logged onto system 1 and are not serving another caller 7. This comparison preferably yields a list of one or more agents 8 who are available to serve a caller 7 and possess the searched-for skill set.

Occasionally a search may find no available, qualified agents 8 to serve a caller 7. Because callers 7 typically do not wish to wait for a relatively prolonged period of time to be assisted, ACD system 1 preferably ensures that each caller 7 is provided informational services within a reasonable period of time. System 1 preferably maintains a configurable maximum waiting time (MWT) value in memory 3 which represents a time period during which each caller 7 should be connected to an agent 8. In addition, processor 2 and system software 4 are preferably capable of calculating an estimated waiting time (EWT) a caller 7 can be expected to wait for an available agent 8 qualified to serve caller 7 if the search therefor locates no such available, qualified agent 8. System 1 preferably determines a course of action based upon a comparison of the calculated EWT value to the predetermined MWT value in order to provide a level of service to a caller 7 within the predetermined MWT.

The calculation of the EWT period a caller 7 is expected to wait for an available, qualified agent 8 is preferably based upon a number of factors. For example, the calculation of the EWT period takes into consideration the number agents 8 who are logged onto system 1, allowed to accept calls 6 from the particular queue 9, and serving other callers 7. The calculation of the EWT period is also based upon the extent an agent 8 handles calls 6 from the particular queue 9 at issue relative to other queues 9.

The formula for calculating the EWT period for a caller 7 is $$EWT=((N+1)*H)-W/(A*F),$$

where N represents the number of calls 6 already in queue 9, H represents the calculated average time an agent 8 spends assisting a caller 7 previously placed in queue 9, and W represents the amount of time the caller 7 at the top of queue 9 has been therein. Parameter A represents the number of agents who are logged onto system 1, allowed to serve callers 7 placed in queue 9 and presently busy serving other callers 7.

The parameter F is a factor represented as a percentage of callers 7 the busy, logged-in agents 8 serve from the particular queue 9 relative to the total number of callers 7 served thereby. Specifically, parameter F is defined as $$F=(N1/N2)*(1+Q),$$

wherein N1 is the total number of calls to the particular queue 9 that is handled by agents identified by parameter A during a measurement period, N2 is the total number of calls that is handled by agents identified by parameter A during the measurement period, and Q is a percentage of time the particular queue 9 is occupied by at least one caller 7 during the measurement period. By considering the real situation of agents 8 being assigned to handle callers 7 from more than one queue 9, the use of parameter F provides a more accurate calculation of the EWT for a caller 7.

With further regard to the desire to provide service to a caller 7 from a qualified agent 8 within the MWT period, ACD system 1 preferably takes action to ensure that a caller 7 who is placed in a queue 9 is connected to a suitable agent 8 within the MWT period. Specifically, a timer element 11 within processor 2 is preferably activated when a caller 7 is first placed in a queue 9. Timer element 11 maintains the actual waiting time (AWT) a caller 7 remains in an assigned queue 9. Processor 2 and system software 4 preferably determine a course of action based upon a comparison of the AWT for a caller 7 in a queue 9 to the predetermined MWT value in order to provide a level of service to a caller 7 within the predetermined MWT.

The method of assigning a qualified agent 8 to an incoming caller 7 is based in part upon the concept of identifying a relatively less qualified agent 8 if it appears that no fully qualified agent 8 will be available to the caller 7 during the MWT period. The desired set of skills which an agent 8 should possess to serve a caller 7 is preferably reduced to include a larger number of qualified agents 8 until it appears that the an agent 8 will be available to caller 7 during the MWT period. The reduction of the desired skill set ensures that each caller 7 will be assigned to a skilled agent 8 within a reasonable period of time.

Figure 2:
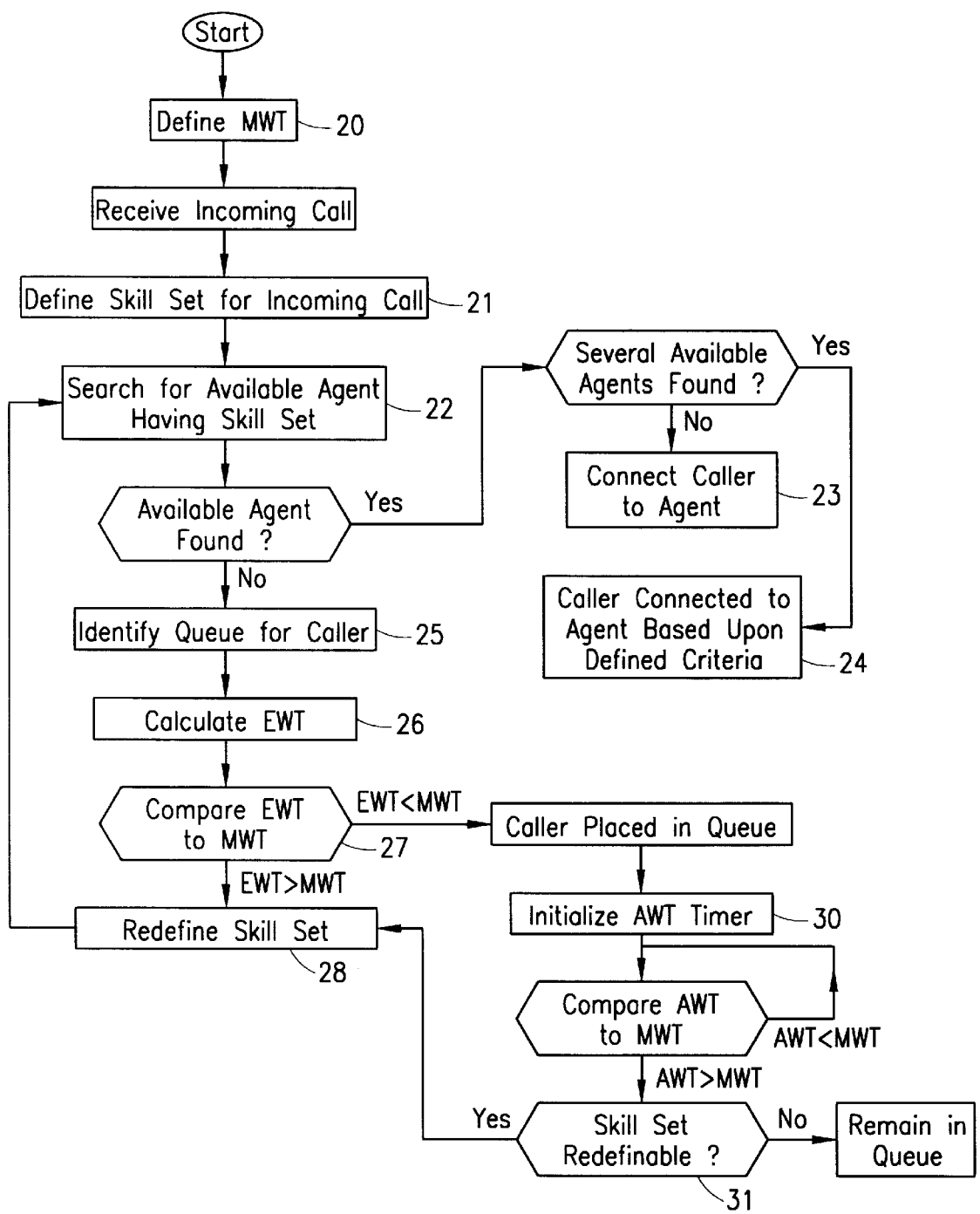
FIG. 2 is a flow chart illustrating the operation of the automatic call distribution system according to the present invention.

The operation of the present ACD system 1 will be described with reference to FIG. 2. Initially, the predetermined MWT value is maintained in memory 3 at step 20. Upon receipt of an incoming call 6 by a caller 7, the system identifies at step 21 the informational needs of caller 7 and determines the set of skills an agent 8 should possess to suitably handle caller 7.

Next, ACD system 1 searches agent database 10 at step 22 for agents 8 who possess the desired skill set determined in step 21. After identifying those qualified agents 8, the agents 8 who are not logged into system 1 or logged onto system 1 but serving other callers 7 are filtered from the list of qualified agents to obtain a list of available, qualified agents 8.

If the search identified an agent 8 possessing the desired skill set, caller 7 is transferred thereto at step 23. In the event the search identified more than one agent 8 possessing the desired skill set, caller 7 is transferred to one of the identified agents 8 at step 24 based upon a predetermined criteria. The predetermined criteria, maintained in memory 3, may assign caller 7 to the identified agent 8 who has been available to serve an incoming caller 7 for the longest period of time. The criteria may alternatively assign caller 7 to the identified agent 8 having the highest or lowest skill level among those agents 8 identified in the search.

In the event that the search found no available agents 8 possessing the desired skill set, system 1 identifies at step 25 the most appropriate queue 9 for caller 7. The EWT for caller 7 is then calculated at step 26 based upon the factors discussed above. The calculated EWT is compared to the predetermined MWT period at step 27. The comparison result is an indicator as to the ability of system 1 to provide caller 7 with an agent having the desired skill set within the MWT period.

If the calculated EWT is found to be greater than the predetermined MWT at step 27 (thereby indicating that an agent 8 having the desired skill set cannot be provided to caller 7 during the MWT period), system 1 preferably redefines the desired agent skill set at step 28 to include a greater number of agents 8 who may have an adequate set of skills to serve caller 7. For example, the skill set could be redefined by eliminating one of the required skills identified in step 21, thereby reducing the skills required by an agent in order to serve caller 7. By redefining the skill set in this manner, there is a greater chance an agent 8 will be identified upon performing another search.

Following the redefinition of the skill set in step 28, system 1 repeats search step 22 using the redefined skill set. So long as no available agents 8 are identified, the calculated EWT is greater than the MWT value and the skill set is capable of being redefined, system 1 iteratively searches for available agents from an increasingly larger pool of agents 8 in order to identify a qualified agent 8 to serve caller 7 within a reasonable period of time.

In the event the calculated EWT value is less than the MWT value at step 27, caller 7 is placed in the queue 9 identified in step 25. At this point, timer element 11 is initiated to begin monitoring the time that caller 7 remains in queue 9 (step 30). Because callers 7 are to be connected to an agent 8 within a MWT period from first connecting to the ACD system 1, if the AWT period for caller 7 exceeds the predetermined MWT period, then a determination is made at step 31 whether the skill set may be further redefined. If it is determined that the skill set for caller 7 may be further redefined, operation proceeds to step 28 wherein the skill set is redefined. Operation then proceeds to step 22 during which another search is performed using a larger pool of agents 8. If no available agents 8 are identified from the search, the skill set may be further redefined at step 27 and yet another search performed at step 22. If it is determined that the skill set for caller may not be further redefined, then caller 7 remains in queue 9.

Although the preferred embodiment of the system and method of the present invention have been illustrated in the accompanying drawings and described in the foregoing detailed description, it will be understood that the invention is not limited to the embodiment disclosed, but is capable of numerous rearrangements, modifications and substitutions without departing from the spirit of the invention as set forth and defined by the following claims.

What is claimed is:

1. A method for distributing a telephone call to an agent in a skills-based call system, said method comprising the steps of:

determining the informational needs of a caller associated with the telephone call;

defining a skill set an agent must possess in order to serve the caller based upon the determined informational needs thereof;

searching for an available agent possessing the defined skill set;

estimating a time during which the caller is expected to wait before the available agent possessing the defined skill set is found, in response to an available agent not being found during the step of searching;

comparing the estimated waiting time for the caller with a predetermined maximum waiting time;

redefining the defined skill set an agent must possess in order to serve the caller, in response to the estimated waiting time being greater than the maximum waiting time during the step of comparing;

searching for any available agent possessing the redefined skill set; and connecting the caller to an available agent in response to an available agent possessing the redefined skill set being identified.

2. The method of claim 1, wherein:

the redefined skill set defines that a qualified agent possess less skills than the skills defined by a qualified agent in the skill set as originally defined in the step of defining.

3. The method of claim 1, wherein:

the skill set comprises a listing of specific skills that an agent possess in order to serve the caller.

4. The method of claim 1, further including the step of:

placing the caller in a queue in response to a determination that the estimated waiting time is less than the maximum waiting time during the step of comparing.

5. The method of claim 4, further including the step of:

monitoring an actual waiting time during which the caller is in the queue.

6. The method of claim 5, further including the steps of:

comparing the actual waiting time to the maximum waiting time;

redefining the skill set upon an affirmative determination that the actual waiting time exceeds the maximum waiting time during the step of comparing the actual waiting time; and searching for any available agent possessing the redefined skill set based upon the affirmative determination that the actual waiting time exceeds the maximum waiting time.

7. The method of claim 6, further including the step of:

determining whether the skill set may be redefined following the step of comparing the actual waiting time to the maximum waiting time.

8. The method of claim 6, further including the steps of:

connecting the caller to an available agent identified during the step of searching for any available agent possessing the redefined skill set based upon the affirmative determination that the actual waiting time exceeds the maximum waiting time.

9. The method of claim 1, wherein:

the steps of defining and redefining the skill set are performed for each caller to the skills-based call system.

10. The method of claim 9, wherein:

the steps of defining and redefining a skill set are performed for a caller to the system substantially independently of the steps of defining and redefining the skill set performed for other callers to the skills-based system.

11. The system of claim 1, further comprising the step of:

following the step of searching for any available agent having the redefined skill set and in response to there being no available agent having the redefined skill set, repeating the steps of estimating, comparing and redefining until an occurrence of one of the estimated waiting time being less than the maximum waiting time and an available agent having the redefined skill set is found.

12. A system for distributing a telephone call in a telephone call distribution system, comprising:

defining means for defining a set of skills an agent must possess in order to serve a caller associated with the telephone call;

a means for searching for an available agent in the system possessing the defined skill set;

a means for estimating a time during which the caller is expected to wait before an agent possessing the defined skill set is available, in response to an available agent not being found by the means for searching;

a means for comparing the estimated waiting time for the caller with a predefined maximum waiting time;

a means for redefining the defined skill set an agent must possess in order to serve the caller, in response to the estimated waiting time being greater than the maximum waiting time;

a means for searching for any available agent in the system possessing the redefined skill set; and a means for connecting the caller to an available agent possessing the redefined skill set in response to an agent being identified by the means for searching for any agent possessing the redefined skill set.

13. The system of claim 12, further including:

a means for placing the caller in a queue in response to the estimated waiting time for the caller being less than the maximum waiting time.

14. The system of claim 13, further including:

a means for monitoring an amount of time the caller is in the queue.

15. The system of claim 14, further including:

a means for comparing the amount of time the caller is in the queue with the maximum waiting time;

a means for redefining the skill set upon an affirmative determination that the amount of time the caller is in the queue is greater than the maximum waiting time; and a means for searching for any available agent in the system possessing the redefined skill set.

16. The system of claim 15, further including:

a means for connecting the caller to an available agent possessing the redefined skill set based upon the available agent being identified by the means for searching for any available agent possessing the redefined skill set.

17. The system of claim 12, wherein:

the means for estimating a time period includes a means for calculating a percentage of callers in the queue served by agents possessing the defined skill set relative to a total number of callers served thereby.

18. The system of claim 17, wherein:

the means for calculating a percentage of callers includes a means for calculating a percentage of occupancy of the queue.

19. The system of claim 12, wherein:

the means for defining and the means for redefining respectively define and redefine a skill set for each caller to the telephone call distribution system.

20. The system of claim 19, wherein:

the skill set for each caller is defined and redefined substantially independently from the skill set corresponding to other callers to the telephone call distribution system.

21. In an automatic call distribution system, a method of handling an incoming telephone call, comprising the steps of:

initially defining a skill set for an agent qualified to serve a caller;

determining an average time delay for the caller associated with the incoming telephone call to be connected to a qualified agent based upon a position of the caller in a queue of callers waiting for one of a number of qualified agents;

determining the number of qualified agents who serve callers in the queue and are presently serving other callers;

calculating the percentage of callers in the queue served by the qualified agents relative to the total number of callers served by the qualified agents over a predetermined period of time;

calculating a first time delay based upon the number of qualified agents and upon the percentage of callers served thereby;

subtracting the first time delay from the average time delay to obtain an estimated waiting time delay;

comparing the estimated waiting time delay to a predetermined maximum caller waiting time delay; and redefining the skill set for the agent qualified to serve the caller based upon an affirmative determination that the estimated waiting time delay is greater than the maximum caller waiting time delay; and placing the caller in the queue of callers based upon the estimated waiting time delay value.

22. The method of claim 21, wherein:

the step of calculating the first time delay includes the step of multiplying the number of qualified agents by the percentage of callers served thereby to obtain a first product.

23. The method of claim 22, wherein:

the step of calculating the first time delay includes the step of dividing the waiting time for a caller positioned at the top of the queue by the first product to obtain the first time delay.

24. The method of claim 21, further including the steps of:

initially defining a skill set for the an agent qualified to serve the caller; and comparing the estimated waiting time delay to a predetermined maximum caller waiting time delay;

wherein the caller is placed in the queue during the placing step in response to an affirmative determination that the estimated waiting time delay is less than the maximum caller waiting time delay.

25. The method of claim 21, wherein:

the step of calculating the percentage of callers includes the step of determining the percentage of occupancy of the queue over the predetermined period of time.

26. A computer program product including a computer readable medium having computer readable program code means embodied thereon, for an automatic call distribution system, the computer program product comprising:

first computer readable program code means for defining a skill set an agent must possess in order to serve a caller, based upon the particular needs of the caller;

second computer readable program code means for searching the automatic call distribution system for an available agent possessing the defined skill set;

third computer readable program code means, responsive to the second computer readable program code means, for estimating a time period during which the caller is expected to wait before being served by an agent having the defined skill set;

fourth computer readable program code means for comparing the estimated waiting time period to a maximum caller waiting time period; and fifth computer readable program code means for placing the caller in a queue of callers to be served by at least one agent having the defined skill set, in response to the estimated waiting time period being less than the maximum caller waiting time period; and sixth computer readable program code means for redefining the skill set based upon a determination that the estimated waiting period is greater than the maximum caller waiting time period.

27. The computer program product of claim 26, further including:

seventh computer readable program code means for searching the system for any available agent possessing the redefined skill set.

28. The computer program product of claim 27, further including:

eighth computer readable program code means for connecting the caller to an available agent identified by the seventh computer readable program code means.

29. The computer program product of claim 26, further including:

sixth computer readable program code means for monitoring an amount of time the caller is in the queue;

seventh computer readable program code means for comparing the amount of time the caller is in the queue with the maximum caller waiting time period;

eighth computer readable program code means for redefining the skill set based upon a determination by the seventh computer readable program code means that the amount of time the caller is in the queue exceeds the maximum caller waiting time period; and ninth computer readable program code means for searching for an available agent having the redefined skill set redefined by the eighth computer readable program code means.

30. The computer program product of claim 26, wherein:

the third computer readable program code means includes a sixth computer readable program code means for calculating a percentage of callers in the queue served by agents possessing the skill set relative to the total number of callers served thereby.

31. The computer program product of claim 30, wherein:

the sixth computer readable program code means includes a seventh computer readable program code means for determining a percentage of occupancy of the queue by one or more callers.

* * * * *

UNITED STATES PATENT AND TRADEMARK OFFICE
CERTIFICATE OF CORRECTION

PATENT NO. : 6,130,942
DATED : October 10, 2000
INVENTOR(S) : Bo Stenlund

It is certified that error appears in the above-identified patent and that said Letters Patent is hereby corrected as shown below:

<u>Column 9,</u>
Line 41, replace "waiting period" with -- waiting time period --

<u>Title page,</u>
Please amend the title page of the patent as follows:
[56], References Cited, U.S. Patent Documents,
Please add:
-- 5,206,903   4/27/93   Kohler, et al.
   5,506,898   4/9/96    Costantini, et al. --

Signed and Sealed this

Thirtieth Day of October, 2001

Attest:

NICHOLAS P. GODICI
Attesting Officer     Acting Director of the United States Patent and Trademark Office